US006977826B2

(12) United States Patent
Huang et al.

(10) Patent No.: US 6,977,826 B2
(45) Date of Patent: Dec. 20, 2005

(54) VOLTAGE REGULATOR AND METHOD FOR REGULATING VOLTAGE

(75) Inventors: Hsin-Kai Huang, Taipei (TW); Jin-Kae Jang, Taichung (TW); Yi-Ming Chang, Taipei (TW); Wen-Jong Tu, Ilan (TW)

(73) Assignee: Primax Electronics Ltd., Taipei (TW)

( * ) Notice: Subject to any disclaimer, the term of this patent is extended or adjusted under 35 U.S.C. 154(b) by 103 days.

(21) Appl. No.: 10/632,418

(22) Filed: Aug. 1, 2003

(65) Prior Publication Data

US 2004/0114405 A1 Jun. 17, 2004

(30) Foreign Application Priority Data

Dec. 13, 2002 (TW) .............................. 91136193 A

(51) Int. Cl.[7] .............................................. H02M 3/335

(52) U.S. Cl. ..................... 363/21.18; 363/21.1; 363/97

(58) Field of Search ........................... 363/21.04, 21.1, 363/21.11, 21.12, 21.18, 97

(56) References Cited

U.S. PATENT DOCUMENTS

| | | | | |
|---|---|---|---|---|
| 5,325,282 | A * | 6/1994 | Bansard | 363/21.13 |
| 5,373,434 | A | 12/1994 | Malik | |
| 5,382,893 | A * | 1/1995 | Dehnel | 320/160 |
| 6,373,730 | B1 | 4/2002 | Komatsu et al. | |
| 6,906,502 | B2 * | 6/2005 | Kernahan et al. | 323/282 |

* cited by examiner

*Primary Examiner*—Gary L Laxton
(74) *Attorney, Agent, or Firm*—Madson & Metcalf

(57) ABSTRACT

A voltage regulator for use in a charging device of a portable electronic apparatus is disclosed. The voltage regulator includes a transformer having a primary winding and a secondary winding, a switch circuit being controlled via a control end thereof so as to result in a variable current on the primary winding, a rectification circuit electrically connected to the secondary winding, and proceeding a charging operation in response to an induced current, and a micro-controller electrically connected to the switch circuit and generating a pulse width modulation (PWM) signal to the control end in response to the charging operation. In addition, a method for operating a voltage regulator is also disclosed.

9 Claims, 3 Drawing Sheets

VOLTAGE REGULATOR AND METHOD FOR REGULATING VOLTAGE

FIELD OF THE INVENTION

The present invention relates to a voltage regulator, and more particularly to a voltage regulator for use in a portable electronic apparatus. In addition, the present invention also relates to a method for regulating the voltage of a portable electronic apparatus.

BACKGROUND OF THE INVENTION

Due to the advance of technology, the electrical appliances become smaller and lighter. Besides the size, how to efficiently reduce the power consumption without adversely effecting the operation and functions of the portable electronic apparatus is a challenge for the designer.

Please refer to FIG. 1 which is a schematic diagram illustrating a conventional high voltage regulator for use with a flashlight of a digital camera. As shown, the conventional high voltage regulator includes a transformer 100, a ringing-choke converter (RCC) 102, a rectifying diode 104, a capacitor C, a comparator 106, a micro-processor 108 and an AND gate 110. The primary winding of the transformer 100 includes two input endpoints and one inter-tapping end. The inter-tapping end and one of the input endpoints are connected to the RCC 102 and the other input endpoint is connected to a power source voltage (Vs). One end of the secondary winding of the transformer 100 is grounded and the other end is connected to one end of the rectifying diode 104. The capacitor C is connected between the other end of the rectifying diode 104 and ground so that a rectification circuit is formed between the rectifying diode 104 and the capacitor C. As shown in FIG. 1, two resistors R1 and R2 are connected to each other in series and the combination thereof is further connected to the capacitor C in parallel. The negative electrode of the input end of the comparator 106 is connected between two resistors R1 and R2 while the positive electrode of the comparator 106 is connected to a reference voltage (Vref). The output end of the comparator 106 is connected to the micro-processor 108 and one input end of the AND gate 110. The other input end and the output end of the AND gate 110 are connected to the micro-processor 108 and the RCC 102, respectively.

When the high voltage regulator starts operating, there is no voltage in the capacitor. The positive electrode of the input end of the comparator 106 has a voltage larger than that of the negative electrode, so as to output a high level from the comparator 106 to the micro-processor 108 and the AND gate 110. After receiving the high level, the micro-processor 108 provides another high level to the AND gate 110. Since both input ends of the AND gate 110 receive the high level, the output end of the AND gate 110 outputs the high level to the RCC 102.

Once receiving the high level, the RCC 102 starts to oscillate for generating a pulse signal from the center-trap of the primary winding of the transformer 100. The duty cycle of the pulse signal is smaller at first, gradually increases, and then reaches a stable status after a certain period. When the pulse signal goes to the primary winding of the transformer 100, the secondary winding of the transformer 100 generates an induced current. Thus, the capacitor C starts to be charged via the operation of the rectifying diode 104. When the capacitor C is charged to a certain voltage, e.g. 330V, the certain voltage is divided by the resistors R1 and R2, and compared with the reference voltage Vref in the comparator 106 so as to output a low level to one input end of the AND gate 110. Then, the output end of the AND gate 110 outputs the low level to stop the oscillation of the RCC 102. At this time, the capacitor C finishes the charge ready for the flashlight.

Besides the flashlight, other devices of a digital camera, e.g. a liquid crystal display (LCD), may also consume much power. Hence, the conventional digital camera is not able to switch on the LCD and actuate the high voltage regulator of the flashlight at the same time. In other words, the LCD is not able to be turned on until the capacitor C is fully charged and the micro-processor 108 stops the operation of the high voltage regulator of the flashlight. Then, the user can focus the camera and take a photo.

The current leakage, however, is always a problem for an electric apparatus, and so is for a digital camera. If it takes too much time to focus the digital camera after the capacitor is fully charged, the voltage of the capacitor will largely drop because of the current leakage. At this moment, the micro-processor 108 interrupts and stops the focusing operation. That is, the LCD is shutdown and the high voltage regulator of the flashlight is re-started. It is necessary to wait the capacitor to be fully charged, the user can focus the digital camera again. Since it consumes a lot of power to restart the RCC 102, the conventional digital camera cannot simultaneously bear the power required by the LCD and the high voltage regulator of the flashlight.

Moreover, when the RCC 102 reaches a stable status, the pulse signal has a fixed duty cycle. It has no way to control the RCC 102 to change the duty cycle of the pulse signal in the conventional digital camera.

Therefore, the purpose of the present invention is to develop a high voltage regulator and a method for regulating a voltage to deal with the above situations encountered in the prior art.

SUMMARY OF THE INVENTION

An object of the present invention is to provide a voltage regulator for use in a charging device and a method for regulating a voltage of a charging device for simultaneously using at least two high power-consumption devices in a portable electronic apparatus.

Another object of the present invention is to provide a voltage regulator for use in a charging device and a method for regulating a voltage of a charging device for reducing the size and the cost of the portable electronic apparatus.

According to an aspect of the present invention, there is provided a voltage regulator for use in a charging device of a portable electronic apparatus. The voltage regulator includes a transformer having a primary winding and a secondary winding, a switch circuit being controlled via a control end thereof so as to result in a variable current on the primary winding, a rectification circuit electrically connected to the secondary winding, and proceeding a charging operation in response to an induced current, and a micro-controller electrically connected to the switch circuit and generating a pulse width modulation (PWM) signal to the control end in response to the charging operation.

Preferably, the PWM signal has a variable duty cycle. The micro-controller is preferably controlled by a firmware to generate the variable duty cycle.

Preferably, the rectification circuit includes a rectifying diode and a capacitor electrically connected to each other in series and further electrically connected to the secondary winding. Preferably, the high voltage regulator further includes a comparing circuit electrically connected to the capacitor, and providing an operating condition of the charging operation for the reference of the micro-controller.

According to another aspect of the present invention, there is provided a method for operating a voltage regulator for providing a charging current to a capacitor of a rectification circuit. The method includes steps of providing a first pulse signal with a first duty cycle to a transformer till the capacitor has a voltage reaching a maximum voltage when the capacitor has a voltage smaller than a threshold voltage, and the transformer generating the charging current in response to the first pulse signal, and providing a second pulse signal with a second duty cycle to the transformer till the capacitor has a voltage reaching the maximum voltage by the charging current when the capacitor has a voltage between the threshold voltage and the maximum voltage, and the transformer generating the charging current in response to the second pulse signal. The first duty cycle is greater than the second duty cycle.

Preferably, the first and the second pulse signals are generated by a micro-controller. The micro-controller is preferably controlled by a firmware to generate the first and the second pulse signals with the first and the second duty cycles.

Preferably, the first and the second pulse signals are inputted to a primary winding of the transformer.

According to another aspect of the present invention, there is provided a method for operating a voltage regulator for providing a charging current to a capacitor of a rectification circuit. The method includes steps of comparing a voltage of the capacitor with a threshold voltage, adjusting a duty cycle of a pulse signal according to a comparing result of the voltage of the capacitor with the threshold voltage, and providing the pulse signal to a transformer till the capacitor have a voltage reaching a maximum voltage, and the transformer generating the charging current in response to the pulse signal.

Preferably, the pulse signal provided to the transformer has a first duty cycle when the capacitor has a voltage smaller than the threshold voltage.

Preferably, the pulse signal provided to the transformer has a second duty cycle smaller than the first duty cycle when the capacitor has a voltage between the threshold voltage and the maximum voltage.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
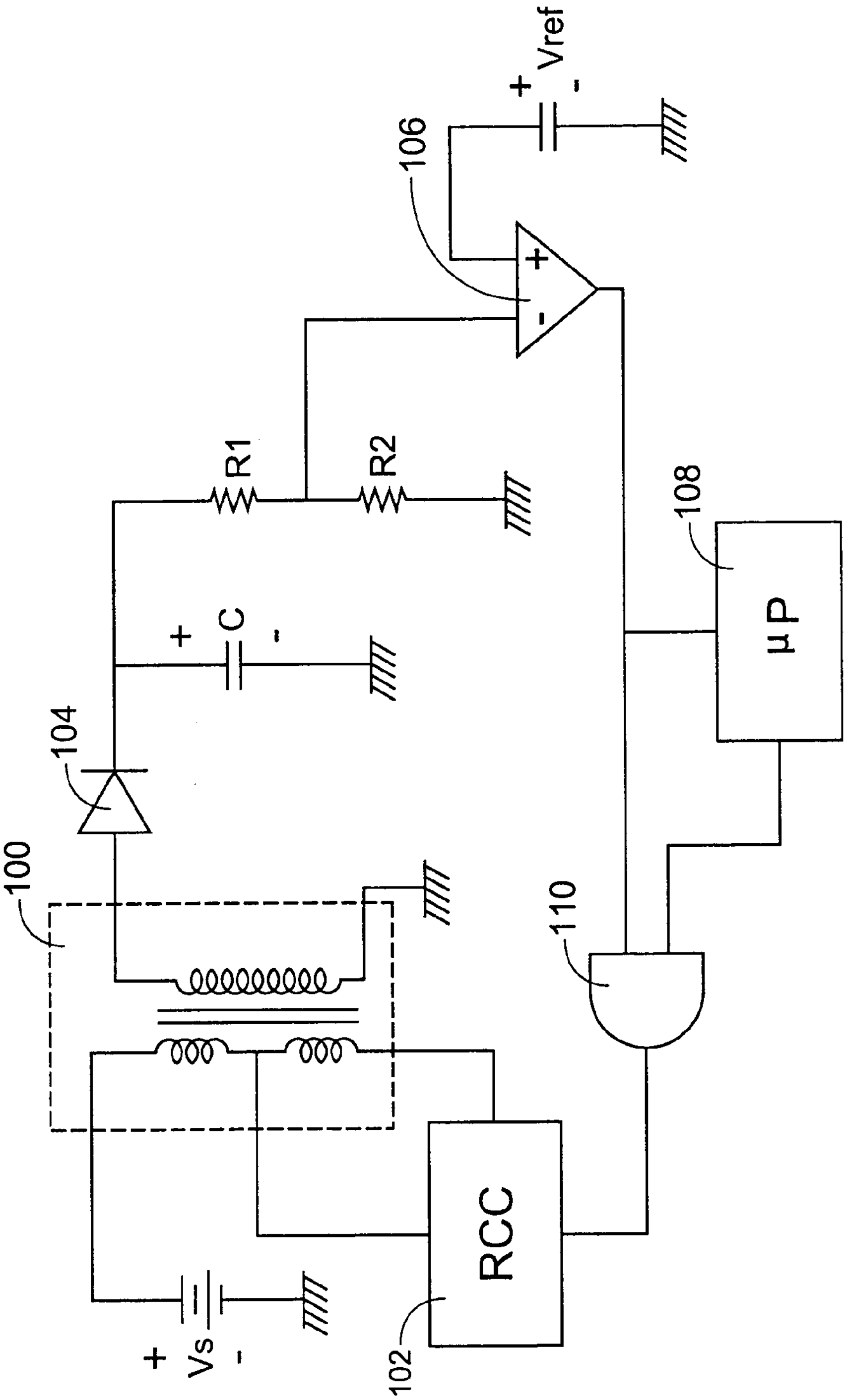
FIG. 1 is a schematic diagram illustrating a conventional high voltage regulator for use with a flashlight of a digital camera.
Figure 2:
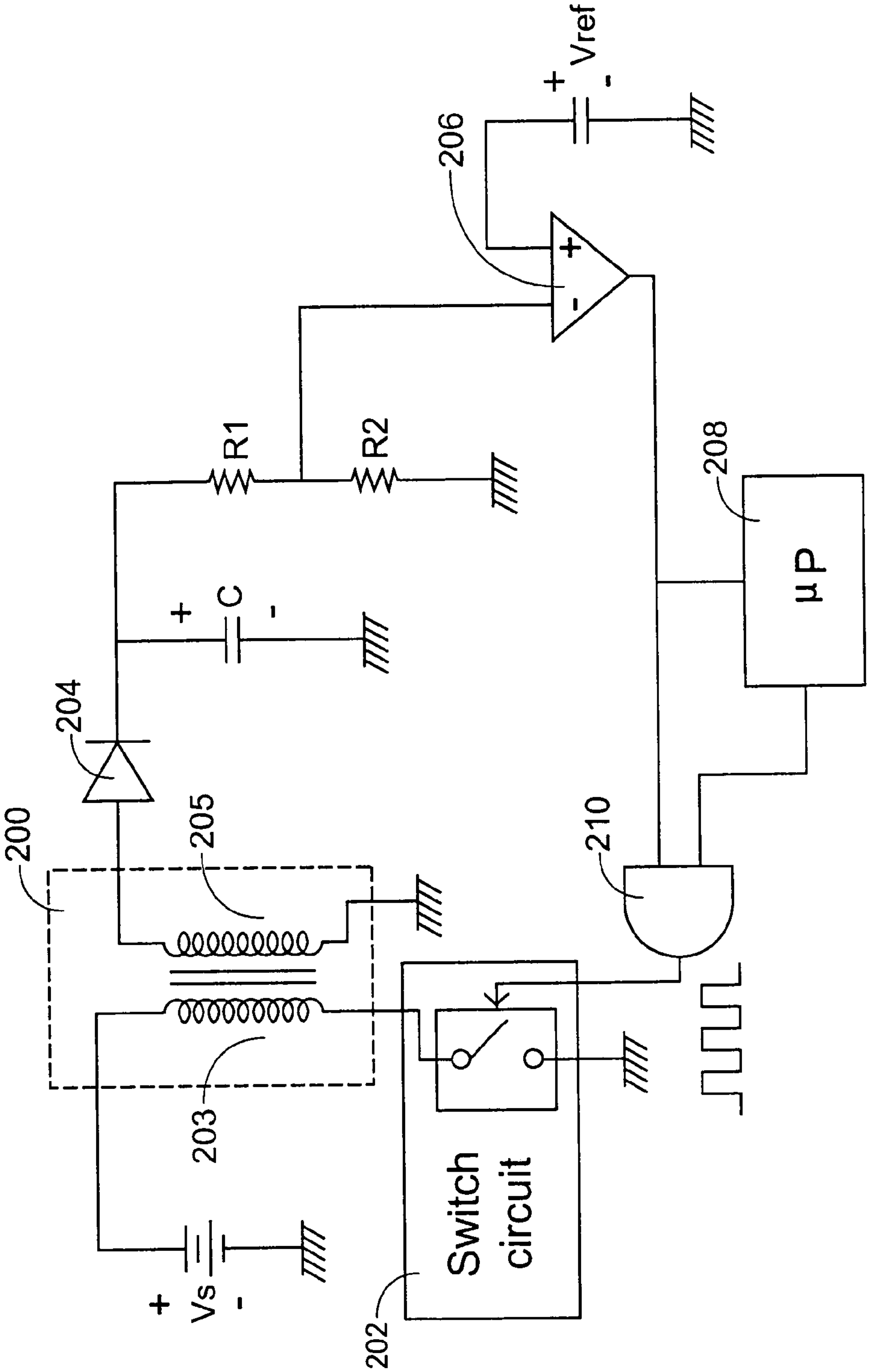
FIG. 2 is a schematic diagram illustrating one preferred embodiment of a high voltage regulator for use with a flashlight of a digital camera according to the present invention.

Please refer to FIG. 2 which is a schematic diagram illustrating one preferred embodiment of a high voltage regulator for use with a flashlight of a digital camera according to the present invention. As shown, the high voltage regulator of the present invention includes a transformer 200, a switch circuit 202, a rectifying diode 204, a capacitor C, a comparator 206, a micro-processor 208 and an AND gate 210. One end of the primary winding of the transformer 200 is connected to a power source voltage (Vs) and the other end is connected to the switch circuit 202. The switch circuit 202 controls a switch to be ON and OFF between the primary winding and ground. One end of the secondary winding of the transformer 200 is grounded and the other end is connected to one end of the rectifying diode 204. The capacitor C is connected between the other end of the rectifying diode 204 and ground so that a rectification circuit is formed between the rectifying diode 204 and the capacitor C. As shown in FIG. 2, two resistors R1 and R2 are connected to each other in series and the combination thereof is further connected to the capacitor C in parallel. The negative electrode of the input end of the comparator 206 is connected between two resistors R1 and R2 while the positive electrode of the comparator 206 is connected to a reference voltage (Vref). The output end of the comparator 206 is connected to the micro-processor 208 and one input end of the AND gate 210. The other input end and the output end of the AND gate 210 are connected to the micro-processor 208 and the switch circuit 202, respectively.

When the high voltage regulator starts operating, there is no voltage in the capacitor C. The positive electrode of the input end of the comparator 206 has a voltage larger than that of the negative electrode, resulting in outputting a high level from the comparator 206 to the micro-processor 208 and the AND gate 210. After receiving the high level, the micro-processor 208 provides an interlocked pulse signal of high level and low level to control the switch circuit 202 via the AND gate 210.

In this embodiment, the pulse signal outputted from the micro-processor 208 is a pulse width modulation (PWM) signal. That is, the duty cycle of the pulse signal is changeable by the firmware control.

When the primary winding of the transformer 200 generates variable current by controlling the switch circuit 202, the secondary winding of the transformer 200 generates an induced current. Thus, the capacitor C starts to be charged via the operation of the rectifying diode 204. When the capacitor C is charged to a certain voltage, e.g. 330V, the certain voltage is divided by the resistors R1 and R2, and compared with the reference voltage Vref in the comparator 206 so as to output a low level to one input end of the AND gate 210. Then, the output end of the AND gate 210 outputs the low level, and the switch circuit 202 keeps turning ON and OFF between the primary winding and ground. At this time, the capacitor C finishes the charge ready for the flashlight.

Since the duty cycle of the PWM signal outputted from the micro-processor 208 is changeable, the micro-processor 208 can provide a PWM signal having a smaller duty cycle to compensate the leakage current of the capacitor C when it takes too much time to focus the digital camera and the voltage of the capacitor largely drops because of the current leakage. The small duty cycle of the PWM signal consumes less power, so the digital camera of the present invention can simultaneously bear the power required by the LCD and the high voltage regulator of the flashlight. In other words, it is unnecessary to wait the capacitor to be fully charged, the user can focus the digital camera again.

Figure 3:
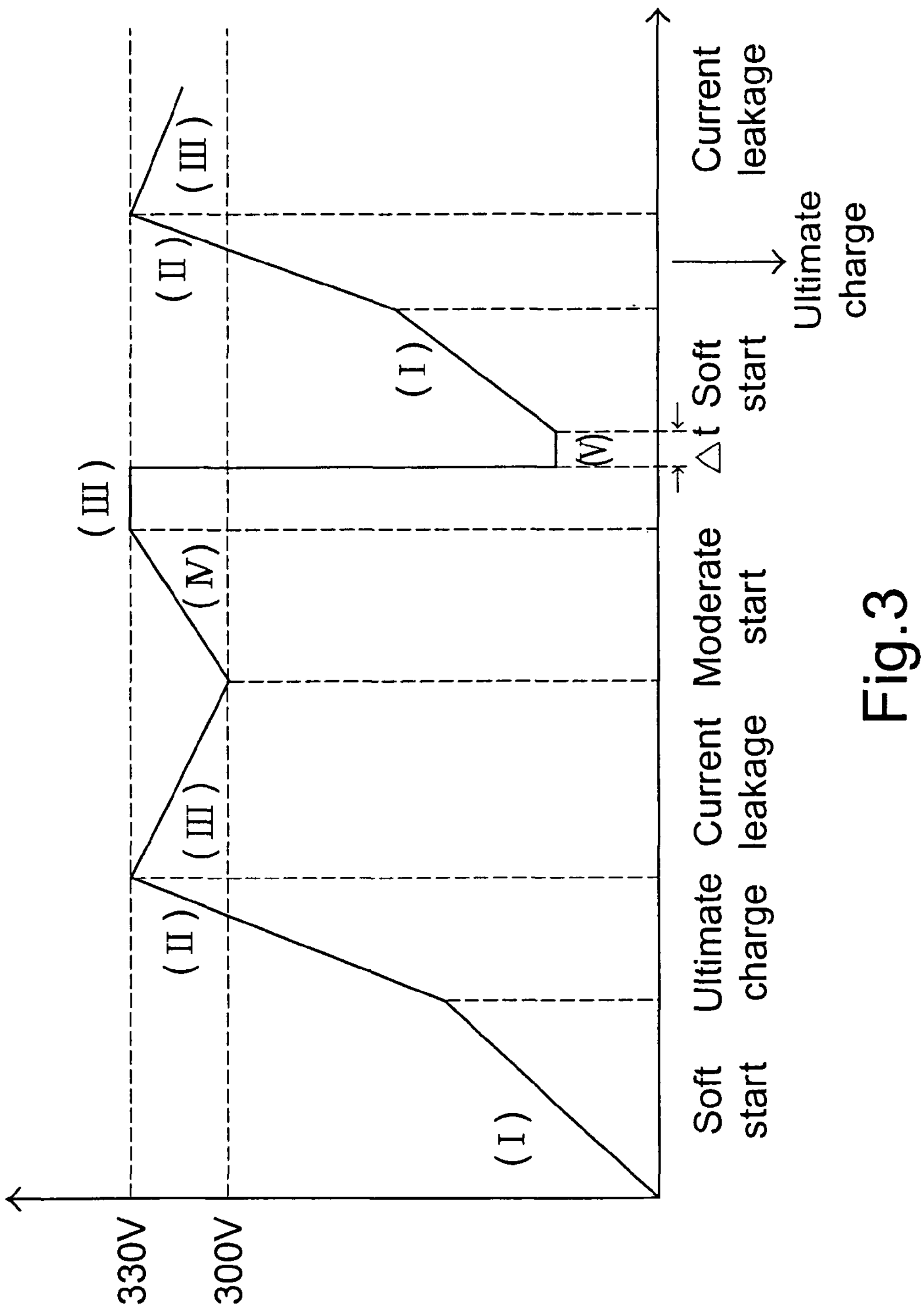
FIG. 3 is a plot illustrating waveform of the voltage of the capacitor C in the high voltage regulator of FIG. 2.

Please refer to FIG. 3 which is a plot illustrating waveform of the voltage of the capacitor C in the high voltage regulator of FIG. 2. As shown in FIG. 3, at the stage I, the curve shows that the capacitor C is charged by a soft start mode. In such soft start mode, the PWM signal outputted from the micro-processor 208 is imitated the duty cycle as small as that of the conventional RCC 102 and is gradually increased that. After a period, the PWM signal outputted from the micro-processor 208 reaches the maximum duty cycle for charging the capacitor C. As the curve of stage II shown, the capacitor C keeps being charged at full speed till the voltage reaches 330V. Then, the micro-processor 208 stops outputting the PWM signal. At the stage III, the curve shows that when the voltage of the capacitor C decreases to 300V due to the current leakage, the micro-processor 208 can re-start to output the PWM signal again. The micro-processor 208 generates the PWM signal with a smaller duty cycle, for example at half the speed, to charge the capacitor C at stage IV. Thus, the voltage of the capacitor C gradually increases to 330V again as shown in FIG. 3. In such way, the voltage of the capacitor C is variable between 330V and 300V. When the flashlight is operated, the capacitor C is quickly discharged so as to the voltage quickly drops below 300V at the stage V. Then, the micro-processor 208 re-starts to charge the capacitor C by the soft start mode. Thus, the stage I, II, III and IV is repeated.

The voltage regulator according to the present invention provides an adjustable duty cycle of the PWM signal of the switch circuit 202 and the micro-processor 208, so as to achieve that the power source of the digital camera can drive the displaying of LCD and the charging of the capacitor C at the same time. In addition, the size and the cost of the digital camera according to the present invention can be reduced because the RCC is not applied in the present invention.

The voltage regulator according to the present invention can be applied to not only the digital camera but also all portable electronic apparatuses.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A voltage regulator for use in a charging device of a portable electronic apparatus, comprising:

a transformer having a primary winding and a secondary winding;

a switch circuit being controlled via a control end thereof so as to result in a variable current on said primary winding;

a rectification circuit electrically connected to said secondary winding, and proceeding a charging operation in response to an induced current, wherein said rectification circuit includes a rectifying diode and a capacitor electrically connected to each other in series and further electrically connected to said secondary winding; and a micro-controller electrically connected to said switch circuit and generating a first pulse width modulation (PWM) signal with a first duty cycle to said transformer until said capacitor has a voltage reaching a maximum voltage when said capacitor has a voltage smaller than a threshold voltage such that said transformer generates a charging current in response to said first pulse width modulation signal, and said micro-controller generating a second PWM signal with a second duty cycle to said transformer until said capacitor has a voltage reaching said maximum voltage by said charging current when said capacitor has a voltage between said threshold voltage and said maximum voltage such that said transformer generates said charging current in response to said second PWM signal, wherein said first duty cycle is greater than said second duty cycle to permit simultaneously using at least two high power-consumption devices in the portable electronic apparatus.

2. The high voltage regulator according to claim 1 wherein said micro-controller is controlled by a firmware to generate said variable duty cycle.

3. The high voltage regulator according to claim 1 further comprising a comparing circuit electrically connected to said capacitor, and providing an operating condition of said charging operation for the reference of said micro-controller.

4. A method for operating a voltage regulator for providing a charging current to a capacitor of a rectification circuit, comprising steps of:

providing a first pulse signal with a first duty cycle to a transformer till said capacitor has a voltage reaching a maximum voltage when said capacitor has a voltage smaller than a threshold voltage, and said transformer generating said charging current in response to said first pulse signal; and providing a second pulse signal with a second duty cycle to said transformer until said capacitor has a voltage reaching said maximum voltage by said charging current when said capacitor has a voltage between said threshold voltage and said maximum voltage, and said transformer generating said charging current in response to said second pulse signal, wherein said first duty cycle is greater than said second duty cycle, wherein the lower second duty cycle permits simultaneously using at least two high power-consumption devices in the portable electronic apparatus.

5. The method for operating a voltage regulator according to claim 4 wherein said first and said second pulse signals are generated by a micro-controller.

6. The method for operating a voltage regulator according to claim 5 wherein said micro-controller is controlled by a firmware to generate said first and said second pulse signals with said first and said second duty cycles.

7. The method for operating a voltage regulator according to claim 4 wherein said first and said second pulse signals are inputted to a primary winding of said transformer.

8. The method for operating a voltage regulator according to claim 4 wherein said rectification circuit includes a rectifying diode and said capacitor electrically connected to each other in series and further electrically connected to a secondary winding of said transformer.

9. A method for operating a voltage regulator for providing a charging current to a capacitor of a rectification circuit for simultaneously using at least two high power-consumption devices in a portable electronic apparatus, comprising steps of:

comparing a voltage of said capacitor with a threshold voltage;

adjusting a duty cycle of a pulse signal according to a comparing result of said voltage of said capacitor with said threshold voltage; and providing said pulse signal to a transformer until said capacitor has a voltage reaching a maximum voltage, and said transformer generating said charging current in response to said pulse signal, wherein said pulse signal provided to said transformer has a first duty cycle when said capacitor has a voltage smaller than said threshold voltage and said transformer has a second duty cycle smaller than said first duty cycle when said capacitor has a voltage between said threshold voltage and said maximum voltage.

* * * * *

UNITED STATES PATENT AND TRADEMARK OFFICE

CERTIFICATE OF CORRECTION

PATENT NO. : 6,977,826 B2
APPLICATION NO. : 10/632418
DATED : December 20, 2005
INVENTOR(S) : Huang et al.

It is certified that error appears in the above-identified patent and that said Letters Patent is hereby corrected as shown below:

<u>Column 2</u>
Line 22, after "wait" insert --for--
Line 23, change "charged, the" to --charged before the--

<u>Column 3</u>
Line 7, after "transformer" change "till" to --until--
Line 12, after "transformer" change "till" to --until--
Line 33, after "transformer" change "till" to --until--
Line 34, after "capacitor" change "have" to --has--

<u>Column 5</u>
Line 2, after "wait" insert --for--
Line 2, change "charged, the" to --charged before the--
Line 9, change "is imitated the duty cycle" to --imitates the duty cycle--
Line 10, change "and is gradually increased that" to --and gradually increases--
Line 14, after "transformer" change "till" to --until--
Line 14, change "shown" to --shows--

<u>Column 6</u>
Line 31, after "transformer" change "till" to --until--

Signed and Sealed this

Thirteenth Day of May, 2008

JON W. DUDAS
*Director of the United States Patent and Trademark Office*